United States Patent
Fung et al.

[11] Patent Number: 5,881,251
[45] Date of Patent: Mar. 9, 1999

[54] HOT SWAP CONTROL CIRCUIT

[75] Inventors: Laurie P. Fung, Pleasanton; Craig D. Lindberg, San Jose, both of Calif.

[73] Assignee: Bay Networks, Inc., Santa Clara, Calif.

[21] Appl. No.: 728,202

[22] Filed: Oct. 10, 1996

[51] Int. Cl.[6] .................................................. G06F 13/00
[52] U.S. Cl. ........................................... 395/283; 307/147
[58] Field of Search ................................... 395/283, 282, 395/281; 307/147, 148

[56] References Cited

U.S. PATENT DOCUMENTS

| | | | |
|---|---|---|---|
| 5,432,916 | 7/1995 | Hahn et al. | 395/283 |
| 5,473,499 | 12/1995 | Weir | 395/283 |
| 5,530,810 | 6/1996 | Bowman | 395/283 |
| 5,584,030 | 12/1996 | Husak et al. | 395/283 |
| 5,625,238 | 4/1997 | Ady et al. | 395/283 |
| 5,636,347 | 6/1997 | Muchnick et al. | 395/283 |
| 5,644,731 | 7/1997 | Liencres et al. | 395/283 |
| 5,726,506 | 3/1998 | Wood | 307/147 |

*Primary Examiner*—Glenn A. Auve
*Attorney, Agent, or Firm*—Blakely Sokoloff Taylor & Zafman, LLP

[57] ABSTRACT

A circuit board having a load is inserted into a chassis of a digital system while the system remains in operation. During insertion, a ground potential is provided to the circuit board. Next, one or more voltage potentials are provided, however, no electrical path is provided from the voltage potentials, through the load, to ground. An enhancement voltage is provided to the circuit board, allowing the load to charge. Finally, a backplane is connected to the circuit board after the load has charged. The circuit board includes a soft start circuit that allows the load to charge gracefully after the enhancement voltage is provided. In one embodiment, the soft start circuit includes an RC circuit connected to a switch which gradually turns on as the RC circuit charges, thereby providing an electrical path from the circuit board load to ground through the switch. The switch may be a MOSFET. Once the circuit board load is charged, connecting the backplane bypasses the MOSFET, thereby eliminating nearly all quiescent current flow through, and associated power dissipation in, the MOSFET. The circuit board is extracted from the chassis of the digital system by first disconnecting the backplane. When this occurs, the MOSFET is no longer bypassed by the backplane connection and quiescent current again flows through the MOSFET. Next, the enhancement voltage is removed, allowing the MOSFET to gradually turn off as the RC circuit discharges, thereby removing the electrical path from the load to ground. The voltage and ground potential are then removed.

27 Claims, 3 Drawing Sheets

HOT SWAP CONTROL CIRCUIT

FIELD OF THE INVENTION

The present invention relates generally to digital systems that utilize circuit boards and, more particularly, to a method and apparatus for allowing insertion and removal of circuit boards while the digital system remains in continuous operation.

BACKGROUND

Computers, digital switches, and other digital systems are becoming ever more present with the high technological boom of the late twentieth century. A vast majority of these digital systems utilize various types of circuit boards that are installed in a chassis of the digital system. The circuit boards typically contain circuitry that supplements system operations and aids in enhancing system performance.

Invariably it is necessary to replace circuit boards due to system upgrades or circuit board failures. The process of replacing (or swapping) a circuit board is carried out by extracting the circuit board from the digital system chassis, and replacing it with another circuit board. Originally systems had to be powered-down while inserting or removing a circuit board. System power-downs were necessary in order to prevent voltage spikes that could potentially damage the new circuit board. However, in applications that required non-stop operation, it was impracticable to power down the system in order to change circuit boards. Therefore, a method for installing or removing circuit boards during continuous system operation was needed.

In response to the need for non-stop system operation during circuit board replacement, "hot swap" circuit boards began to be developed. Hot swap circuit boards typically integrate "hot swap" circuitry which allows the digital system to remain powered during circuit board insertions or removals by controlling circuit board voltages during insertion and removal.

Traditional hot swap circuit boards control board voltage by using various methods. Such methods include the use of discrete logic, proximity sensors, and other types of electrical techniques. However, electrical methods for hot swap control have various drawbacks. Many hot swap circuit designs require power to be dissipated at all times during circuit board operation. This type of design places limitations on circuit board voltages and currents. Other hot swap designs require high chip counts or feedback control systems. Consequently, hot swap methods that are currently available are complex, area consuming, and expensive.

SUMMARY OF THE INVENTION

According to one embodiment, a circuit board having a circuit board load is inserted into a chassis of a digital system while the digital system remains in operation. As the circuit board is inserted, a ground potential is provided to the circuit board. Next, one or more voltage potentials are provided to the circuit board, however, no electrical path is provided from the voltage potentials, through the circuit board load, to ground. As the insertion process continues, an enhancement voltage is provided to the circuit board. The circuit board is configured to allow the circuit board load to charge in response to the provision of the enhancement voltage. Finally, a backplane is connected to the circuit board after the circuit board load has charged.

The circuit board includes a soft start circuit to allow the circuit board to charge gracefully after the enhancement voltage is provided. In one embodiment, the soft start circuit includes an RC circuit which charges over a predetermined time after the enhancement voltage is provided. The RC circuit is connected to a switch which gradually turns on as the RC circuit charges, thereby providing an electrical path from the circuit board load to ground through the switch. In one embodiment, the switch is a MOSFET having a current rating appropriate to the quiescent circuit board load current. Once the circuit board load is charged, connecting the backplane bypasses the MOSFET, thereby eliminating nearly all current flow through, and associated power dissipation in, the MOSFET.

The circuit board is extracted from the chassis of the digital system by first disconnecting the backplane. When this occurs, the MOSFET is no longer bypassed by the backplane connection and quiescent current again flows through the MOSFET. Next, the enhancement voltage is removed allowing the switch to gradually turn off as the RC circuit discharges through a resistor circuit, thereby removing the electrical path from the circuit board load to ground. The one or more voltage potentials are then removed from the circuit board. Finally, the ground potential is removed from the circuit board, completing the extraction process.

BRIEF DESCRIPTION OF THE DRAWINGS

The present invention is illustrated by way of example and not limitation in the figures of the accompanying drawings in which.

DETAILED DESCRIPTION

Figure 1:
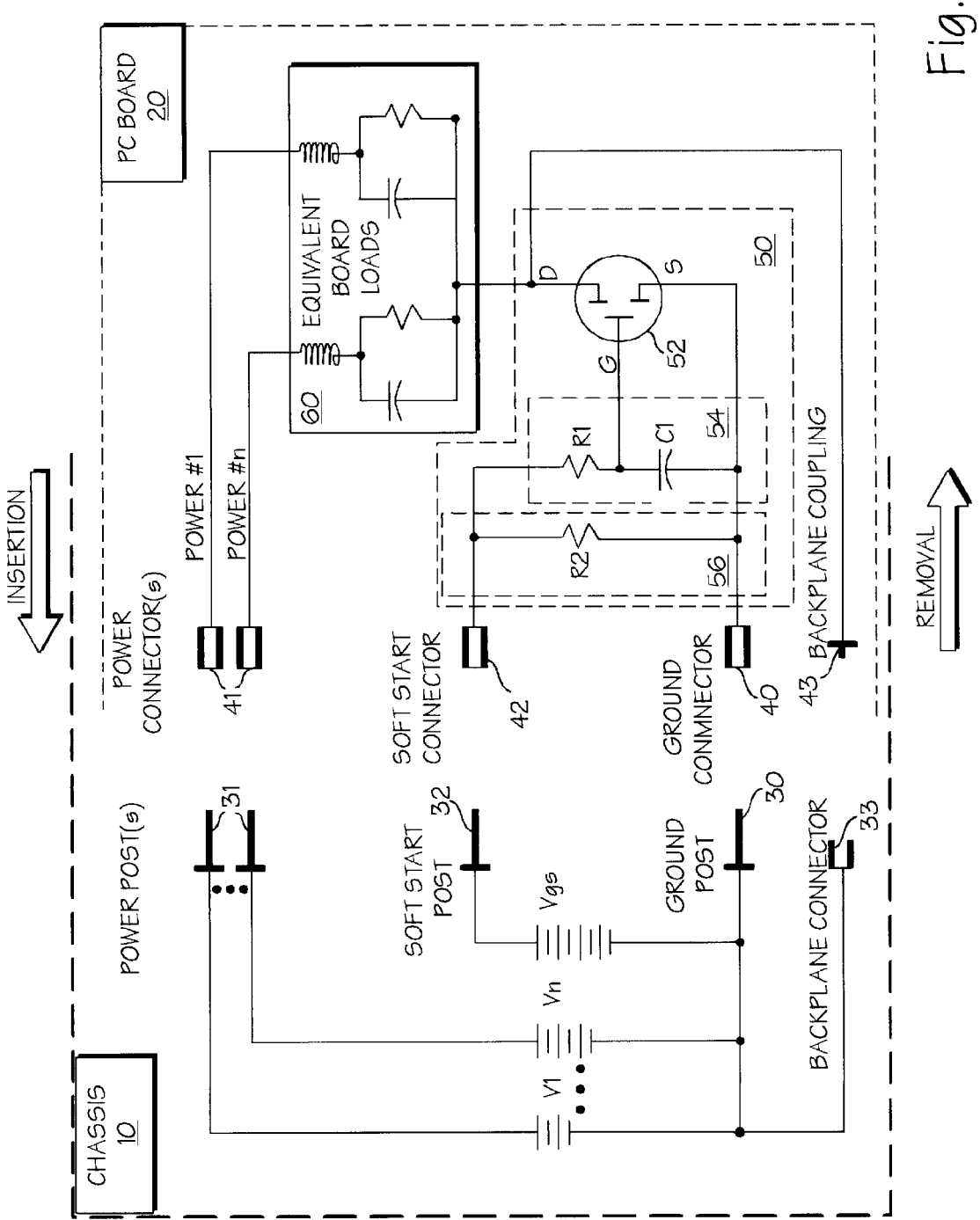
FIG. 1 illustrates a digital system configured according to one embodiment of the present invention.

Referring to the drawings in detail, wherein like numerals designate like parts and components, the following description sets forth numerous specific details in order to provide a thorough understanding of the present invention. However, after reviewing this specification, it will be apparent to those skilled in the art that the present invention may be practiced without some or all of these specific details. In other instances, well known circuit designs and techniques have not been described in detail in order not to unnecessarily obscure the present invention.

FIG. 1 illustrates a digital system 5 configured in accordance with the present invention. Digital system 5 includes a chassis 10 and a circuit board 20. Chassis 10 includes a ground post 30, power posts 31, a soft start post 32, and a backplane connector 33. Circuit board 20 includes a ground connector 40, power connectors 41, a soft start connector 42, a backplane coupling 43, a switch circuit 50, and board loads 60. Circuit board 20 may be inserted into or extracted from chassis 10 at any time, without having to power down the digital system 5.

In one embodiment, chassis 10 is configured so that ground post 30 will make contact with ground connector 40 as circuit board 20 is inserted into chassis 10 before any other electrical connections between circuit board 20 and chassis 10 are established. For the embodiment shown in FIG. 1, this is accomplished by making ground post 30 longer than power posts 31, soft start post 32 and backplane connector 33. Power posts 31, and soft start post 32 are approximately the same length. Circuit board 20 is configured such that ground connector 40 and power connectors 41 are situated on the leading edge of circuit board 20. Soft start connector 42 is recessed a desired distance from the edge of circuit board 20. The recess distance will depend upon the charge and discharge time of switch circuit 50. In one embodiment, soft start connector 42 is recessed a distance of 0.2" from the leading edge of circuit board 20.

Insertion of circuit board 20 into chassis 10, should be carried out in a controlled manner. Ground post 30 on chassis 10 is first coupled with the ground connector 40 on circuit board 20 in order to facilitate electrostatic discharge of the circuit board 20. Next, power post(s) 31 on chassis 10 is/are coupled with power connector(s) 41 on circuit board 20. Each power connector 41 is coupled to a respective circuit board load 60. Circuit board loads 60 represent the equivalent circuit loads for the various circuits located on circuit board 20. Notice that even though power posts 31 are connected to power connectors 41, no current flows across circuit board loads 60 because switch circuit 50 acts as an open circuit, preventing a path from the circuit board loads 60 to ground.

As insertion of circuit board 20 into chassis 10 continues, soft start post 32 of chassis 10 is coupled with soft start connector 42 of circuit board 20. Soft start connector 42 is coupled to switch circuit 50. Switch circuit 50 includes a MOSFET 52, an RC circuit 54 and a resistor circuit 56. RC circuit 54 includes resistor R1 and capacitor C1. Resistor circuit 56 includes resistor R2. After soft start post 32 and soft start connector 42 are connected, enhancement voltage Vgs from chassis 10 is applied across RC circuit 54. RC circuit 54, in turn, slowly provides power to turn on MOSFET 52 over a predetermined time interval. The predetermined time interval is a time constant calculated from a Laplace step function in which resistor R1 and capacitor C1 are determined values. In one embodiment, for an enhancement voltage of 12 V, the predetermined time interval is approximately 5 milliseconds in the transition region of the MOSFET, determined by an RC time constant of approximately 50 milliseconds (produced by a resistor value R1 of 5KΩ, a capacitance value C1 of 1 $\mu$F and a MOSFET transition voltage range of 3 to 4 V).

As MOSFET 52 switches on, circuit board loads 60 are provided with a path to ground post 30. Those skilled in the art will recognize that MOSFET 52 is current rated depending upon the magnitude of the quiescent circuit board loads 60. After circuit board loads 60 are charged, and as circuit board 20 is further inserted into chassis 10, backplane connector 33 on chassis 10 is coupled to backplane coupling 43 on circuit board 20. Backplane coupling 43 on circuit board 20 and backplane connector 33 on chasis 10 provide a current path which bypasses MOSFET 52. As a result, even though MOSFET 52 remains turned on, there is little or no further power dissipation in MOSFET 52.

Extraction of circuit board 20 from chassis 10 should also be carried out in a controlled manner. During extraction, backplane connector 33 is first disconnected from backplane coupling 43 and quiescent current again begins to flow through MOSFET 52 to ground post 30. As extraction of circuit board 20 continues, soft start post 32 is disconnected from soft start connector 42. Disconnecting soft start post 32 in this fashion causes RC circuit 54 to discharge through resistor circuit 56, allowing circuit board load 60 to power down gracefully as MOSFET 52 switches off. As the extraction process continues, power posts 31 are disconnected from power connectors 41, removing all voltage from circuit board 20. After power posts 31 are disconnected, ground post 30 is disconnected from ground connector 40, completing the extraction of circuit board 20 from chassis 10.

Figure 2A:
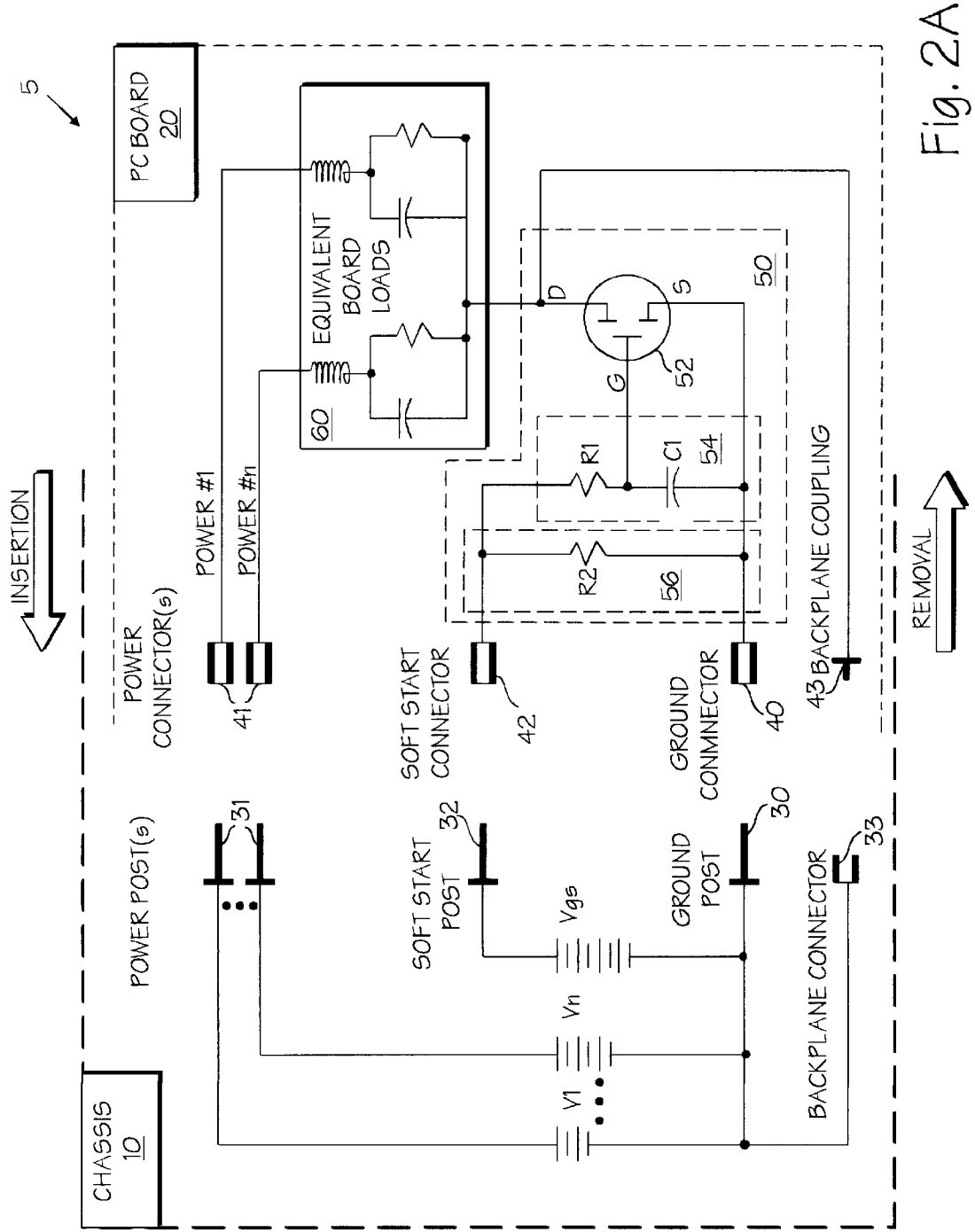
FIG. 2a illustrates a digital system configured according to a second embodiment.

FIG. 2a illustrates an alternative embodiment of digital system 5. In this embodiment, chassis 10 is again configured so that ground post 30 is longer than power posts 31 and soft start post 32. However, power posts 31, and soft start post 32 are of different lengths. Soft start post 32 is shorter than power posts 31. The measure of distance between the length of power posts 31 and soft start post 32 again depends upon the charge and discharge time of switch circuit 50. With this embodiment, ground connector 40, power connectors 41, and soft start connector 42 may all be situated on the leading edge of circuit board 20. The provision (during insertion) or removal of the various potentials will occur in the same sequence as that described above as circuit board 20 is inserted or extracted from chassis 10 despite the different physical configuration.

Figure 2B:
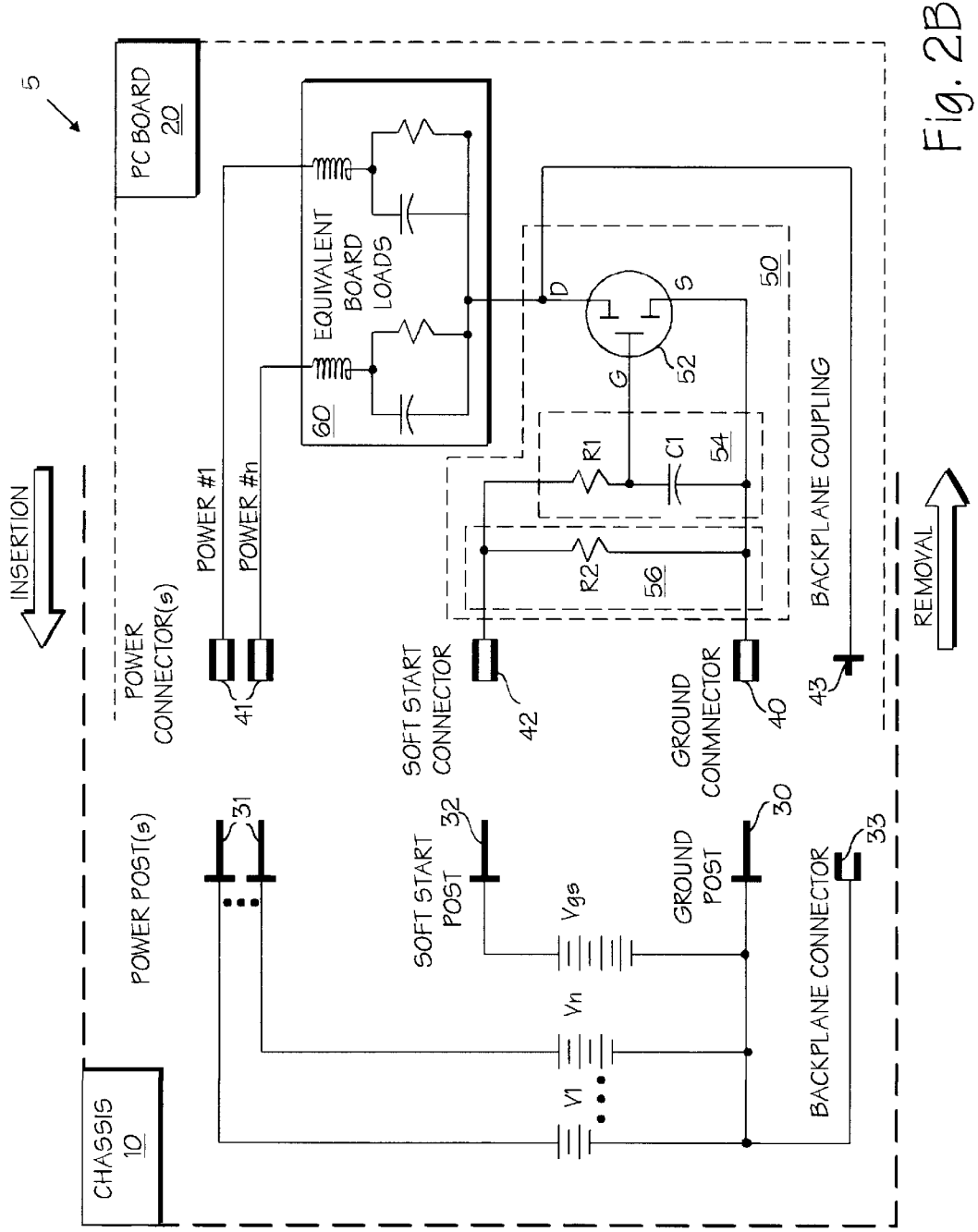
FIG. 2b illustrates a digital system configured according to a third embodiment.

FIG. 2b illustrates yet another embodiment of digital system 5. In this embodiment, chassis 10 is configured so that ground post 30, power posts 31, and soft start post 32 are all the same length. Circuit board 20 is configured such that ground connector 40 is situated on the leading edge of circuit board 20. Power connectors 41 are recessed a first distance from the leading edge of circuit board 20. Soft start connector 42 is recessed a second distance from the leading edge of board 20 so that power connectors 41 will be energized before soft start connector 42 is energized during circuit board insertion. Again, however, this slightly different physical configuration will yield the same power up/power down sequence as described with reference to FIG. 1 as the circuit board 20 is inserted into/extracted from chassis 10.

Although several embodiments illustrating digital system 5 have been discussed, those skilled in the art will appreciate that chassis post and circuit board connector configurations as well as coupling techniques between the chassis 10 and circuit board 20 are possible. Such other variations are within the spirit and scope of the present invention.

Thus, a method and apparatus for hot swap control of circuit boards has been described. In the foregoing specification, the present invention has been described with reference to specific exemplary embodiments thereof. It will, however, be evident that various modifications and changes may be made thereto without departing from the spirit and scope of the invention as set forth in the appended claims. The specification and drawings are, accordingly, to be regarded in an illustrative rather than a restrictive sense.

What is claimed is:

1. A method of hot swapping comprising the steps of:

removing a first circuit board from a chassis having a chassis backplane;

inserting a second circuit board into the chassis, by:
providing a ground potential to the second circuit board before any further voltage potentials are applied thereto by providing a ground path from a ground post located within the chassis to a ground connector located on the second circuit board;
providing one or more voltage potentials to the second circuit board by providing said one or more voltage potentials from one or more respective power posts located within the chassis to one or more power connectors located on the second circuit board;
providing an enhancement voltage to the second circuit board, the second circuit board being configured to allow circuit board load charging in response to the provision of the enhancement voltage, by providing the enhancement voltage from a soft start post located within the chassis to a soft start connector located on the second circuit board, and establishing a controlled current flow through the circuit board load in response to the provision of the enhancement voltage by applying the enhancement voltage across an RC circuit, applying an output voltage from the RC circuit to turn on a switch over a predetermined time interval, and establishing a quiescent current flow from the circuit board load through the switch to the ground connector; and connecting the second circuit board to the chassis backplane after the circuit board load has charged.

2. The method of claim 1, wherein the step of connecting the second circuit board to the chassis backplane further comprises the step of:

connecting a backplane connector located within the chassis to a backplane coupling located on the second circuit board after the circuit board load has charged.

3. The method of claim 2, wherein the step of connecting a backplane connector further acts to bypass a current path from the circuit board load through the switch to the ground connector.

4. A method of hot swapping comprising the steps of:

removing a first circuit board from a chassis having a chassis backplane by disconnecting a backplane connector located within the chassis from a first circuit board backplane coupling located on the first circuit board and establishing a quiescent current flow from a first circuit board load through a switch to an electrical ground, removing the enhancement voltage from the first circuit board, the first circuit board being configured to allow the first circuit board load to discharge in response to the removal of the enhancement voltage, and removing one or more voltage potentials from the first circuit board;

inserting a second circuit board into the chassis, by:
providing a ground potential to the second circuit board;
providing one or more voltage potentials to the second circuit board;
providing an enhancement voltage to the second circuit board, the second circuit board being configured to allow circuit board load charging in response to the provision of the enhancement voltage; and
connecting the second circuit board to the chassis backplane after the circuit board load has charged.

5. The method of claim 4, wherein the step of removing the enhancement voltage from the first circuit board further comprises the steps of:

disconnecting a soft start post located within the chassis from a soft start connector located on the first circuit board;

discharging an RC circuit through a first voltage path on the first circuit board over a predetermined time interval; and opening the switch gradually as the RC circuit discharges so as to create an open circuit between the first circuit board load and the electrical ground, so as to terminate the quiescent current flow in a controlled fashion.

6. The method of claim 5, wherein removing one or more voltage potentials on the chassis from the first circuit board further comprises the step of:

disconnecting one or more power posts located within the chassis from one or more power connectors located on the first circuit board.

7. The method of claim 6, wherein the step of removing one or more voltage potentials on the chassis from the first circuit board further comprises the step of:

disconnecting a ground post located within the chassis from a ground connector located on the first circuit board.

8. A method of inserting a circuit board having a circuit board load into a chassis, the method comprising the steps of:

providing a ground potential to the circuit board before any further voltage potentials are applied thereto by establishing an electrical path between a ground post connector located within the chassis and a ground connector located on the circuit board;

providing one or more voltage potentials to the circuit board by establishing an electrical path between one or more power posts located within the chassis and one or more power connectors located on the circuit board;

providing an enhancement voltage to the circuit board, the circuit board configured to allow circuit board load charging in response to the provision of the enhancement voltage, by establishing an electrical path between a soft start post located within the chassis and a soft start connector located on circuit board, and establishing a controlled current flow through the circuit board load by applying the enhancement voltage across an RC circuit, applying an output voltage from the RC circuit to turn on a switch over a predetermined time interval, and establishing a quiescent current flow from the circuit board load through the switch to the ground connector over the predetermined time interval; and connecting a backplane to the circuit board after the circuit board load has charged.

9. The method of claim 8, wherein the step of connecting a backplane to the circuit board further comprises the step of:

connecting a backplane connector located within the chassis to a backplane coupling located on the circuit board after the circuit board load has charged.

10. The method of claim 9, wherein the step of connecting a backplane connector further acts to bypass a current path from said the circuit board load through the switch to the ground connector.

11. A method of removing a circuit board having a circuit board load from a chassis comprising the steps of:

disconnecting a backplane from the circuit board by disconnecting a backplane connector located within the chassis from a backplane coupling located on the circuit board such that a quiescent current flows through a switch;

removing an enhancement voltage from the circuit board, the circuit board being configured to allow the circuit board load to power down gracefully once the enhancement voltage is removed;

removing one or more voltage potentials from the circuit board once the circuit board load has powered down; and removing a ground potential from the circuit board only after all other voltage potentials have been removed therefrom.

12. A method of removing a circuit board having a circuit board load from a chassis comprising the steps of:

disconnecting a backplane from the circuit board;

removing an enhancement voltage from the circuit board by terminating a quiescent current flow from the circuit board load through a switch to an electrical ground in a controlled fashion, the circuit board thus being configured to allow the circuit board load to power down gracefully once the enhancement voltage is removed;

removing one or more voltage potentials from the circuit board once the circuit board load has powered down; and removing a ground potential from the circuit board only after all other voltage potentials have been removed therefrom.

13. The method of claim 12, wherein the step of terminating a current flow from the circuit board load further comprises the steps of:

disconnecting a soft start post located within the chassis from a soft start connector located on the circuit board;

discharging an RC circuit through a resistor coupled to the electrical ground over a predetermined time interval;

opening the switch as the RC circuit discharges over the predetermined time interval so as to create an open circuit between the circuit board load and the electrical ground in a controlled fashion.

14. The method of claim 12, wherein removing one or more voltage potentials from the circuit board further comprises the step of:

disconnecting one or more power posts located within the chassis from one or more power connectors located on the circuit board.

15. The method of claim 14, wherein the step of removing a ground potential from the circuit board further comprises the step of:

disconnecting a ground post located within the chassis from a ground connector located on the circuit board.

16. A system comprising:

a chassis configured to accommodate one or more circuit boards, said chassis having a backplane, means for providing a voltage potential to at least one of said circuit boards, means for providing a reference potential to said at least one circuit board, and means for providing an enhancement voltage to said at least one circuit board; and a circuit board having a circuit board load, a power connector coupled to said circuit board load, said power connector configured to allow an electrical connection between said means for providing a voltage potential and said circuit board load as said circuit board is inserted into said chassis, a reference potential connector configured to allow an electrical connection between said means for providing a reference potential and said circuit board load as said circuit board is inserted into said chassis and before any other electrical connections to said circuit board are made, a soft start connector coupled to a soft start circuit, said soft start connector configured to couple said means for providing an enhancement voltage to said soft start circuit so as to allow said soft start circuit to gradually energize, thereby providing an electrical connection between said circuit board load and said reference potential as said circuit board is inserted into said chassis, said soft start circuit comprising a soft start switch and an RC circuit coupled to the soft start switch, the RC circuit configured to charge the soft start switch over a predetermined time interval, and a backplane connector configured to provide an electrical connection between said circuit board load and said backplane as said circuit board is inserted into said chassis after said electrical connection between said circuit board load and said reference potential has been established.

17. The system of claim 16, wherein the chassis is configured so that the means for providing a reference potential has a first length, the means for providing a voltage potential has a second length, and the means for providing an enhancement voltage has a third length.

18. The system of claim 17, wherein the circuit board is configured so that the reference potential connector is located at a leading edge of the circuit board, the power connector is located at the leading edge of the circuit board, and the soft start connector is located at the leading edge of the circuit board.

19. The system of claim 16, wherein the chassis is configured so that the means for providing a reference potential has a first length, the means for providing a voltage potential has said first length, and the means for providing a soft start voltage has said first length.

20. The system of claim 19, wherein the circuit board is configured so that the reference potential connector is located at a first distance from a leading edge of the circuit board, the power connector is located at a second distance from the leading edge of the circuit board, and the soft start connector is located at a third distance from the leading edge of the circuit board.

21. The system of claim 16, wherein the RC circuit further comprises:

a capacitor coupled to the soft start switch and to the reference potential connector;

a first resistor coupled to the soft start switch, the capacitor and to the soft start connector; and a second resistor coupled to the soft start connector and to the reference potential connector.

22. The system of claim 21, wherein the soft start switch is a MOSFET.

23. A circuit board having a circuit board load, the circuit board comprising:

a ground connector configured to contact a receptacle for said circuit board before any other electrical connections are made therewith during insertion of said circuit board into said receptacle;

a power connector coupled to said circuit board load;

a soft start circuit coupled to said circuit board load and to said ground connector, said soft start circuit configured to provide a gradual connection between said circuit board load and said ground connector as said soft start circuit is energized, said soft start circuit comprising a soft start switch and an RC circuit coupled to the soft start switch, the RC circuit configured to charge the soft start switch over a predetermined time interval as the soft start circuit is energized; and a backplane connector coupled to said soft start circuit and to said circuit board load, said backplane connector configured to allow an electrical connection between said circuit board load and a reference potential which bypasses said soft start circuit.

24. The circuit board of claim 23, wherein the ground connector is located at a leading edge of the circuit board, the power connector is located at the leading edge of the circuit board, and the soft start connector is located at the leading edge of the circuit board.

25. The circuit board of claim 23, wherein the ground connector is located at a leading edge of the circuit board, the power connector is located at a first distance from the leading edge of the circuit board, and the soft start connector is located at a second distance from the leading edge of the circuit board.

26. The circuit board of claim 23, wherein the RC circuit further comprises:

a capacitor coupled to a soft start switch and to the ground connector;

a first resistor coupled to the soft start switch, the capacitor and to the soft start connector; and a second resistor coupled to the soft start connector and to the ground connector.

27. The circuit board of claim 26, wherein the soft start switch is a MOSFET.

* * * * *